J. E. SCOTT.
RAILROAD BRAKE.
APPLICATION FILED JUNE 3, 1920.
1,374,034.
Patented Apr. 5, 1921.
2 SHEETS—SHEET 1.
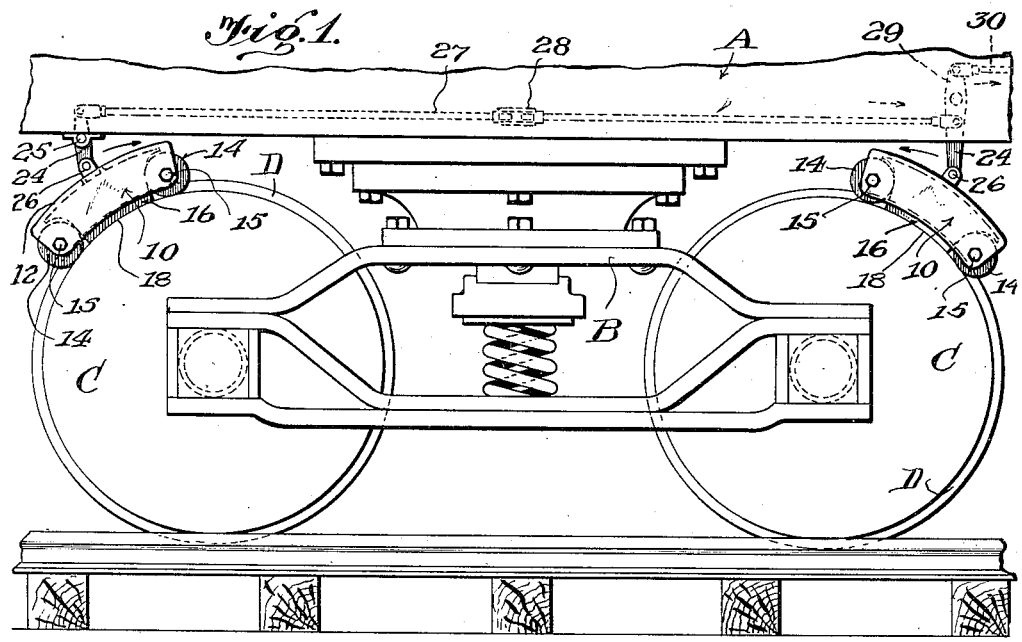
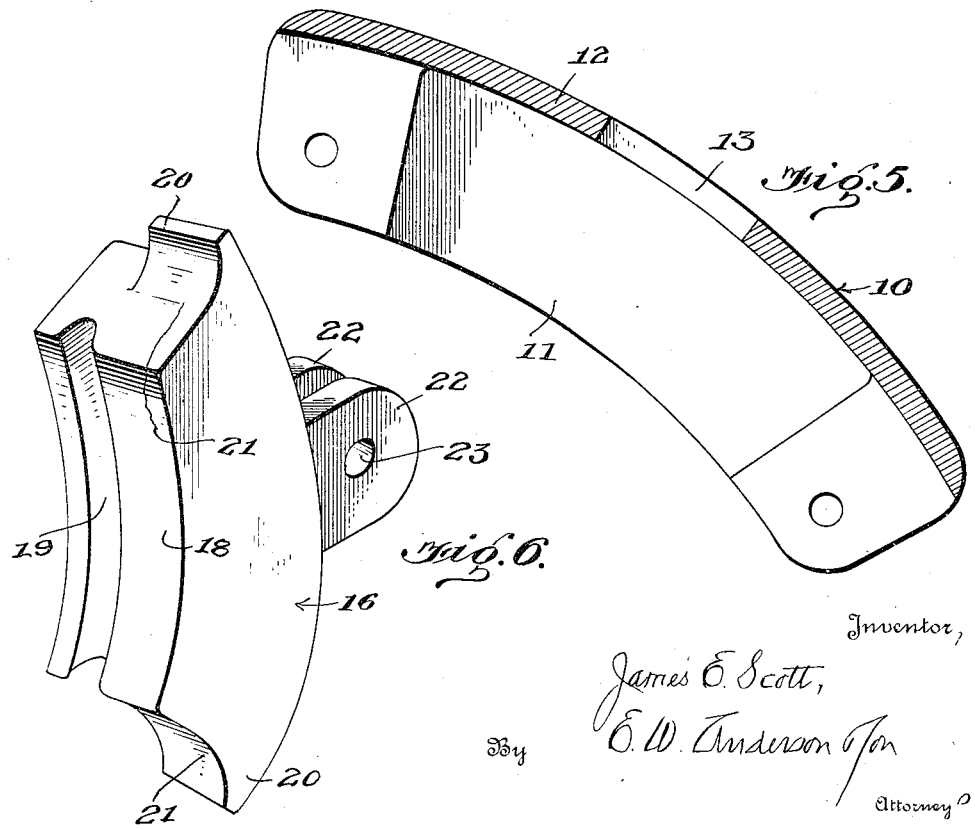
Inventor,
James E. Scott,
By E. W. Anderson Jon
Attorney

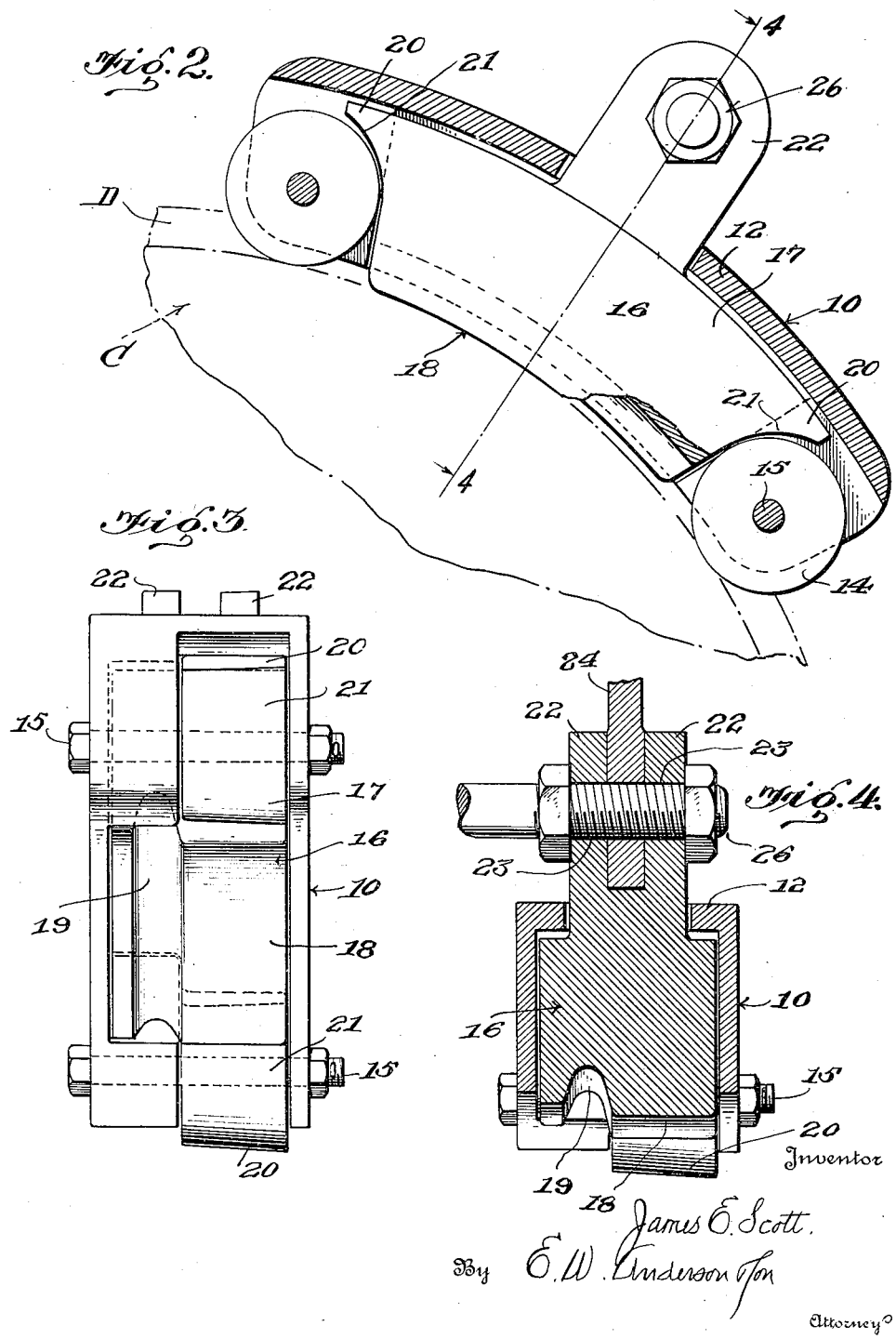

UNITED STATES PATENT OFFICE.

JAMES E. SCOTT, OF LOUISVILLE, KENTUCKY.

RAILROAD-BRAKE.

1,374,034.  Specification of Letters Patent.  Patented Apr. 5, 1921.

Application filed June 3, 1920. Serial No. 386,242.

*To all whom it may concern:*

Be it known that I, JAMES E. SCOTT, a citizen of the United States, resident of Louisville, in the county of Jefferson and State of Kentucky, have made a certain new and useful Invention in Railroad-Brakes; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to brakes for railroad or other cars and has for its object the provision of a novel brake shoe which is so constructed as to exert an efficient braking action without danger of flattening the wheels and which will be free from the usual jerking so common to brake shoes of ordinary construction.

An important object is the provision of a brake shoe which engages not only the tread of the wheel but also the flange thereof, the brake shoe furthermore including rollers which bear upon the wheel and which are themselves braked by the movable element which engages the wheels.

An additional object is the provision of a brake shoe of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the car truck showing a pair of my brake shoes associated with the wheels thereof.

Fig. 2 is a fragmentary side elevation of a car wheel showing my brake shoe associated therewith and in longitudinal section.

Fig. 3 is an end view.

Fig. 4 is a cross sectional view on the line 4—4 of Fig. 2.

Fig. 5 is a longitudinal sectional view through the brake shoe casing, and

Fig. 6 is a perspective view of the movable brake element removed.

Referring more particularly to the drawings, the letter A designates a portion of a car, B designates one of the trucks thereof which is shown as being of ordinary or conventional type, and C designates the wheels.

In carrying out my invention I provide a brake shoe associated with each wheel C and this brake shoe structure comprises a casing or housing 10 which is U-shaped in cross section and which is longitudinally curved whereby to be concentric with the wheel. This housing includes side plates 11 connected by a bight portion 12 which is formed centrally with a rectangular opening 13. Journaled within the end portions of the casing 10 are rollers 14 mounted upon spindles 15 which extend transversely through the side plates 11.

The numeral 16 designates the brake shoe proper as a whole which is formed as a longitudinally curved bar 17 having a brake face 18 concentric with the wheel C and adapted to engage against the tread thereof. Adjacent one edge this bar 17 is grooved, as indicated at 19 for engagement upon the flange D of the wheel. At its ends the bar 17 is formed with curved extensions 20 which extend partly between the rollers 14 and the bight portion 12 of the housing and which have curved faces 21 adapted to engage against the peripheries of the rollers 14 to exert a braking action thereon.

Formed centrally upon the bar 17 are spaced ears 22 which extend slidably through the rectangular opening 13 and these ears are apertured, as shown at 23.

The brake members 10 are associated with the respective wheels C, as clearly shown in Fig. 1, that is they are disposed outwardly of the vertical center lines of the wheels so that one brake shoe may be operated when the car is traveling in one direction and the other may be operated when the car is traveling in the opposite direction. The brake members are mounted upon links 24 which are pivoted intermediate their ends upon the car, as shown at 25, and which are pivotally connected between the ears 22, as shown at 26. The links 24 are connected for simultaneous movement by a rod 27 having a suitable adjusting turn-buckle 28 interposed therein, and one link 24 is provided with an extension 29 with which is connected the conventional pull rod 30.

In the operation of the device it will be seen that when the rod 30 is moved in one direction one of the brake members will be swung into engagement with a wheel and when the rod 30 is moved in the opposite direction the other brake member will be moved into engagement with the adjacent wheel, depending upon the direction of travel of the car.

When a brake member is moved into engagement with a wheel it will be apparent that the rollers 14 will first engage against the tread portion thereof. As the movement of the brake member continues the brake member proper 16 will be so moved that its brake surface 18 will firmly engage against the tread of the wheel with the grooved portion 19 engaging against the flange of the wheel. At the same time the curved faces 21 of the extensions 20 will bear against the peripheries of the rollers 14 and exert a braking action upon them so as to retard their rolling movement with respect to the wheel. When the brakes are thus applied it will be apparent that a very efficient braking action upon the tread and flange of the wheel will be obtained without any sudden jerking and also without danger of flattening the wheel at any point. Owing to the provision of the rollers 14 it will be apparent that the braking action while being very efficient and positive, will be less likely to wear the wheels or the movable elements of the brake so that much longer life of the mechanism will be obtained than in the ordinary type of brake shoe.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A brake shoe comprising a longitudinally curved casing U-shaped in cross section and having its bight portion formed with an opening, rollers journaled transversely of said casing at the ends thereof, a shoe proper disposed within said casing and having a curved face adapted to engage the tread of a wheel, extensions formed on the ends of said shoe proper and having curved faces adapted to engage the peripheries of said rollers simultaneously with the engagement of said face with the tread of a wheel, and an attaching lug carried by the shoe proper and slidably disposed through said opening.

2. A brake shoe comprising a casing including side plates and a connecting plate portion formed with an opening, rollers journaled between said side plates at the ends thereof and adapted to bear against the tread of the wheel, a shoe proper disposed between said side plates and having a curved face adapted to engage the tread of a wheel and formed at its ends with extensions having curved faces adapted to engage the peripheries of said rollers, and spaced ears carried by said shoe proper and extending through said opening.

3. A device of the character described comprising a casing U-shaped in cross section and including side plates and a connecting bight portion formed with an opening, rollers journaled between said side plates at the ends thereof and adapted to bear upon the periphery of a wheel, a shoe proper formed as an elongated bar located between said side plates and having a curved face adapted to engage the tread of a wheel and formed with longitudinal grooves adapted to conformingly engage the flange of a wheel, said shoe proper being formed at its ends for braking engagement with said rollers, and attaching means carried by said shoe proper and slidably extending through said opening.

In testimony whereof I affix my signature in presence of two witnesses.

JAMES E. SCOTT.

Witnesses:
HENRY C. WALBECK,
FRED D. DIEHL.